United States Patent [19]

Kanno et al.

[11] Patent Number: 5,197,910
[45] Date of Patent: Mar. 30, 1993

[54] OUTBOARD MOTOR

[75] Inventors: Nobuyuki Kanno; Yoshiharu Yokoyama, both of Iwata, Japan

[73] Assignee: Yamaha Hatsudoki Kabushiki Kaisha, Iwata, Japan

[21] Appl. No.: 723,840

[22] Filed: Jul. 1, 1991

[30] Foreign Application Priority Data

| Jul. 2, 1990 | [JP] | Japan | 2-175811 |
| Jul. 2, 1990 | [JP] | Japan | 2-175812 |
| Jul. 7, 1990 | [JP] | Japan | 2-180255 |

[51] Int. Cl.$^5$ .......................................... B63H 21/00
[52] U.S. Cl. .................................... 440/89; 440/900; 60/320
[58] Field of Search ................. 440/88, 89, 900; 60/272, 310, 317, 319, 320, 324; 123/527

[56] References Cited

U.S. PATENT DOCUMENTS

| 2,235,140 | 3/1941 | Clarke | 440/900 |
| 2,357,947 | 9/1944 | Gerson | 123/527 |
| 3,601,344 | 8/1971 | Nourse | 440/900 |
| 4,382,574 | 5/1983 | Ellestad | 440/900 |
| 4,638,783 | 1/1987 | Snyder | 123/527 |
| 4,805,403 | 2/1989 | Bowmann | 60/320 |
| 4,811,720 | 3/1987 | Viatumata | 123/527 |
| 4,836,152 | 6/1987 | Riese | 440/900 |
| 4,957,461 | 9/1990 | Nakayama | 440/89 |
| 5,025,758 | 6/1991 | Djurdjevio | 123/527 |

Primary Examiner—Joseph F. Peters, Jr.
Assistant Examiner—Clifford T. Bartz
Attorney, Agent, or Firm—Ernest A. Beutler

[57] ABSTRACT

A number of embodiments of small lightweight outboard motors adapted to be mounted on a watercraft that does not have a transom through a mounting bracket that spans the sides of the hull and is detachably affixed thereto. The outbaord motor is powered by small internal combustion engine that is contained within the lower unit and at least partially submerged beneath the body of water in which the watercraft is operating. Excess cooling of the engine is avoided by circulating at least a portion of the exhaust gases from the exhaust port around the exterior of the internal combustion engine. The engine is powered by a gaseous fuel contained under pressure in a container that is mounted on the mounting portion. Variations in placement and orientation of pressure regulators are disclosed so that fuel pressure will be constant regardless of the trim adjustment of the outboard motor. In addition, the connection between the outboard motor and the mounting bracket is such that the outboard motor may be easily swung from the suspended position in the water to an out-of-the-water position within the hull.

32 Claims, 18 Drawing Sheets

OUTBOARD MOTOR

BACKGROUND OF THE INVENTION

This invention relates to an outboard motor and more particularly to an improved outboard motor powered by a gaseous fuel and having an underwater engine.

It has been proposed to provide a type of outboard motor that is powered by a gaseous fueled two cycle internal combustion engine, which engine is positioned below the body of water in which the watercraft is operating. This type of motor has a relatively small displacement and low power engine and because of its underwater operation, it is quite quiet. For example, this type of engine can have a displacement of about ten cubic centimeters and develop approximately one-half of a horsepower.

Although the underwater location has the advantages of providing silencing and, also, cooling without the provision of a separate cooling jacket for the engine and the need to circulate water through it or the use of finning as with air-cooled engines, the positioning of the engine under the body of water or at least partially in a submerged location can give rise to wide variations in engine operating temperature. In fact, over cooling of the engine can result.

It is, therefore, a principal object of this invention to provide an outboard motor of this type wherein the engine is adequately cooled but over cooling is avoided.

It is a further object of this invention to provide an improved arrangement for maintaining the temperature of an otherwise uncooled internal combustion engine for utilization in an outboard motor of this type.

When the internal combustion engine is positioned beneath or at least partially beneath the water level, there is a problem in assuring good water sealing of the engine. This is primarily due to the fact that the exhaust gases from the engine are normally discharged under water so as to provide silencing for the exhaust system and cooling. However, this means that the water may come into proximity with the engine and thus, with previously proposed constructions, complete water sealing of the engine and all components has been necessary. This, of course, raises the cost of the engine.

It is, therefore, a still further object of this engine to provide an improved outboard motor having an under water position internal combustion engine and wherein the engine itself and its exhaust system are such that the engine need not be fully water tight.

When the internal combustion engine is powered by a pressured gaseous fuel, it is very desirable to provide a pressure regulator to regulate the pressure of the fuel delivered to the engine. As is well known, this type of pressurized fuel is contained within a container in a partially liquid form. As the fuel is consumed from the container, the pressure of the fuel can decrease and thus, unless some form of regulation is incorporated, the fuel/air mixture may vary as the fuel is consumed from the container.

A conventional type of pressure regulator employs a diaphragm which is operated so as to maintain uniform fuel pressure regardless of the amount of fuel maintained in the container. However, it is well known that outboard motors are mounted for some form of tilt movement so as to adjust the degree of submersion of the propeller. When the tilt condition of the outboard motor is changed and with prior art type of constructions, the degree of tilt can alter the operation of the pressure regulator and result in variations in fuel/air mixture depending upon the tilt relationship.

It is, therefore, a further object of this invention to provide an improved regulating system for the pressurized gaseous fuel source of an outboard motor fueled by such a fuel.

It is a further object of this invention to provide an improved pressure regulator and mounting arrangement therefor for a gaseous fuel propelled outboard motor.

In addition to the problem of pressure regulation with respect to tilt movement of the outboard motor, it is also undesirable to have the pressurized fuel container tilt during operation. As has been previously noted, the fuel is contained within the pressure container under pressure and some, if not most, of the fuel may be liquified because of the high pressures employed. However, if the tilt of the fuel container is such that liquid is present at its discharge end, then erratic and unacceptable variations in fuel supply may result.

It is, therefore, a still further object of this invention to provide an improved gaseous fuel supplied outboard motor.

It is a further object of this invention to provide an improved mounting arrangement for the gaseous fuel of such an outboard motor wherein the fuel will not be subject to the tilt operation of the motor.

The type of outboard motor as thus far described is not normally employed with the type of watercraft on which conventional outboard motors are utilized. Conventional outboard motors are normally utilized with watercraft having transoms and the outboard motor carries a clamping bracket that it detachably connected to the transom. In fact, in many applications the mounting bracket of the outboard motor may be relatively permanently attached to the transom. However, with the type of outboard motor disclosed herein the motor is frequently used on a type of watercraft that does not have a transom such as a canoe or the like. Therefore, side mounting of the outboard motor is frequently utilized with this type of watercraft. However, there are many times when it is desirable to move the outboard motor so that it is not in the body of water in which the watercraft is operating. It is, in fact, desirable if the outboard motor may be mounted in such a way that the drive portion can be completely swung in a convenient fashion internally of the hull of the watercraft.

It is, therefore, a still further object of this invention to provide an improved mounting arrangement for an outboard motor that permits it to be conveniently and easily swung from a side of the hull on which it is suspended internally of the outer periphery of the hull without necessitating detachment from the hull.

SUMMARY OF THE INVENTION

A first feature of this invention is adapted to be embodied in an outboard motor having an upper portion adapted to be affixed to the hull of an associated watercraft and a lower unit that is adapted to be at least partially submerged in a body of water in which the watercraft is operating. A propulsion device is carried by the lower unit for powering the watercraft and is driven by an internal combustion engine contained within the lower unit. The internal combustion engine has an exhaust port for discharge of exhaust gases from the engine and an exhaust system for discharging the exhaust gases from the exhaust port externally of the outboard motor. In accordance with this feature of the invention, the exhaust system includes means for circulating the exhaust gases from the exhaust port around a portion of the engine for preventing excessive cooling of the engine from the body of water in which the watercraft is operating.

Another feature of the invention is adapted to be embodied in an outboard motor comprised of an upper portion adapted to be affixed to the hull of an associated watercraft and a lower unit affixed to the upper portion and adapted to be positioned at least in part beneath the level of water in which the watercraft operates. A propulsion unit in the lower unit propels the watercraft through the body of water and an internal combustion engine is provided for powering the propulsion unit. The outboard motor is supported relative to the hull for movement generally in a plane to elevate and lower the depth of the propulsion unit in the body of water. A source of pressurized gaseous fuel is provided for the engine and a pressure regulator is positioned between the source and the engine for regulating the pressure at which the fuel is delivered to the engine. In accordance with this feature of the invention, the pressure regulator includes an element movable for controlling pressure and which element is supported to lie in a plane parallel to the plane of movement of the outboard motor so that the regulated pressure will not vary as the propulsion unit is raised or lowered.

Yet another feature of the invention is adapted to be embodied in an outboard motor having an upper portion that is adapted to be affixed to the hull of an associated watercraft in a lower unit affixed to the upper portion and adapted to be at least partially submerged in the body of water in which the watercraft operates. A propulsion unit is provided in the lower unit for propelling the watercraft through the body of water and an internal combustion engine powers the propulsion unit. The outboard motor is supported for movement relative to the hull between selected positions. A source of pressurized gaseous fuel is supplied for the engine and is supported within the hull remotely from the outboard motor.

Another feature of the invention is adapted to be embodied in an outboard motor that is adapted to be affixed to the hull of an associated watercraft and which includes a mounting portion having means for detachably affixing the mounting portion to opposite sides of the hull. An outboard motor including a propulsion device and powering internal combustion engine is supported by the mounting portion for movement about a first pivot axis between a lowered position in which the propulsion unit is submerged in the body of water in which the watercraft is operating and a raised position. The support for the outboard motor also includes means for pivotally supporting the outboard motor from a raised position parallel to the adjacent side of the hull to a rotated position wherein the outboard motor extends within the hull.

DETAILED DESCRIPTION OF THE PREFERRED EMBODIMENTS OF THE INVENTION

Embodiment of FIGS. 1-9

Figure 1:
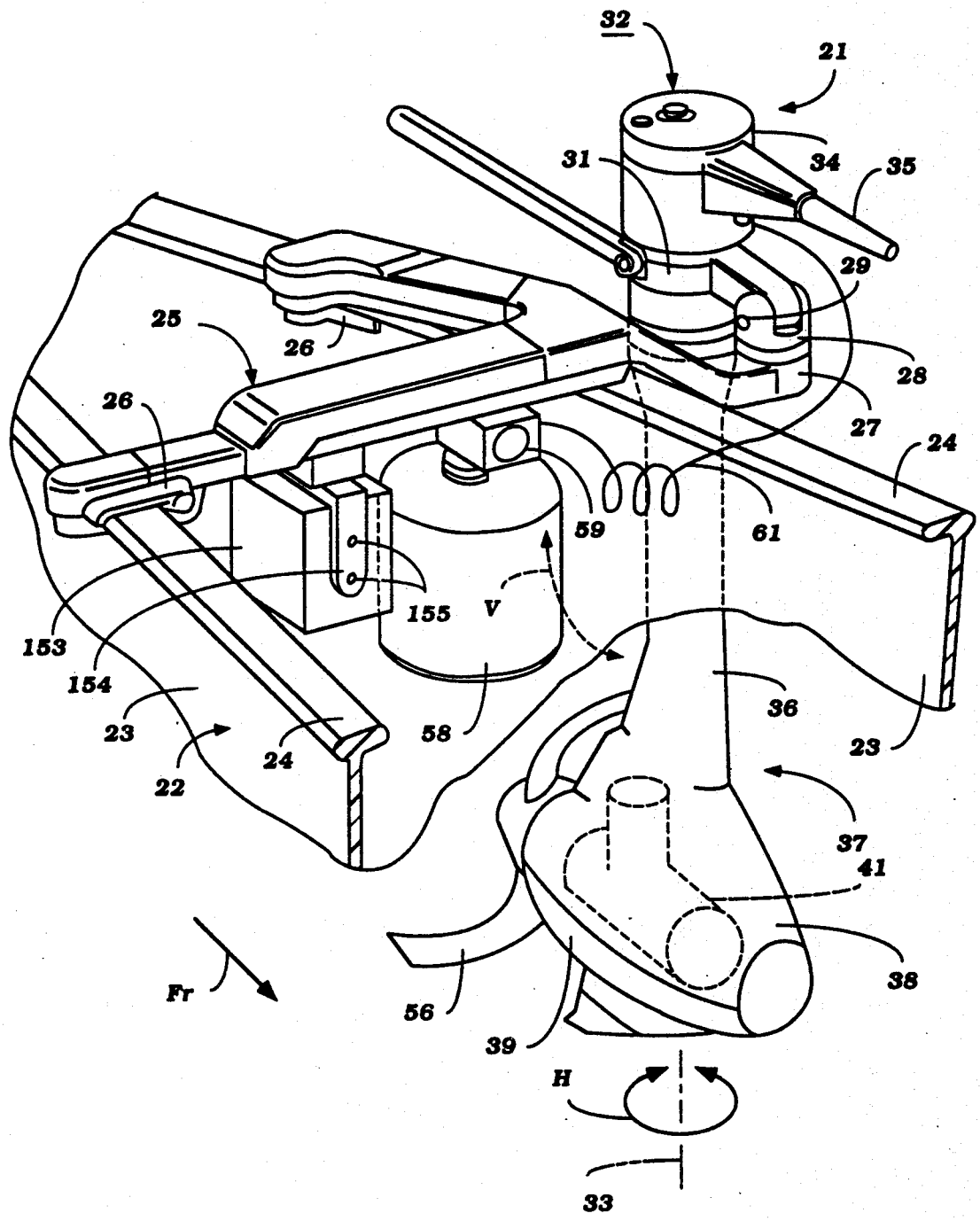
FIG. 1 is a perspective view of an outboard motor constructed in accordance with a first embodiment of the invention, as affixed to the hull of a watercraft, which hull is broken away to more clearly show the construction.

Referring now in detail first to the embodiment of FIGS. 1-9 and initially primarily to FIG. 1, an outboard motor constructed in accordance with an embodiment of the invention is identified generally by the reference numeral 21. The outboard motor 21 is particularly adapted to be employed with a type of watercraft other than that having a transom and with which normal outboard motors are employed. Rather, the outboard motor 21 is particularly adapted to be employed with a type of watercraft, shown partially and indicated by the reference numeral 22 which is not designed with a flat transom but which has a pair of side walls 23 that converge toward the rear end, such as with a canoe, and which have gunnels 24 at their upper end. Although the invention is described in conjunction with such a watercraft, it is to be understood that the invention may also be employed in conjunction with outboard motors that are mounted on the transom of a watercraft. However, and as will become readily apparent, certain facets of the invention have particular utility in conjunction with outboard motors that can be mounted in the type of watercraft depicted.

The outboard motor 21 is comprised of a number of subcomponents including an attaching bracket, indicated generally by the reference numeral 25, which is designed so as to span the hull of the watercraft 22 and which has clamping devices 26 formed thereon for clamping the bracket 25 to the gunnels 24. The construction of the clamping bracket 25 will be described in more detail by reference to the embodiment of FIGS. 14–18 wherein this construction is shown in more detail.

The mounting bracket 25 has an outrigger portion 27 that carries a pivot pin (not shown in this embodiment) to which a bracket 28 is pivotally connected for rotation of the bracket 28 about the outrigger portion 27, for a reason which will be described. A pivot pin 29 connects the bracket 28 to a yoke portion 31 which journals the propulsion portion 32 of the outboard motor 21 for steering movement about a generally vertically extending steering axis, indicated by the dot/dash line 33 for steering movement in a direction indicated by the arrow H. The pivot pin 29 permits trim adjustment and tilt movement of the propulsion unit 32.

The propulsion unit 32 includes an upper portion 34 to which a steering tiller 35 is affixed for steering of the propulsion unit 32 about the forenoted axis 33. A tubular upper portion 36 is connected to the upper portion 34 and depends downwardly to a lower unit 37. The lower unit 37 has a housing assembly comprised of an upper piece 38 and a lower piece 39 that are connected to each other and which contains an internal combustion engine, shown in phantom and identified generally by the reference numeral 41.

Figure 2:
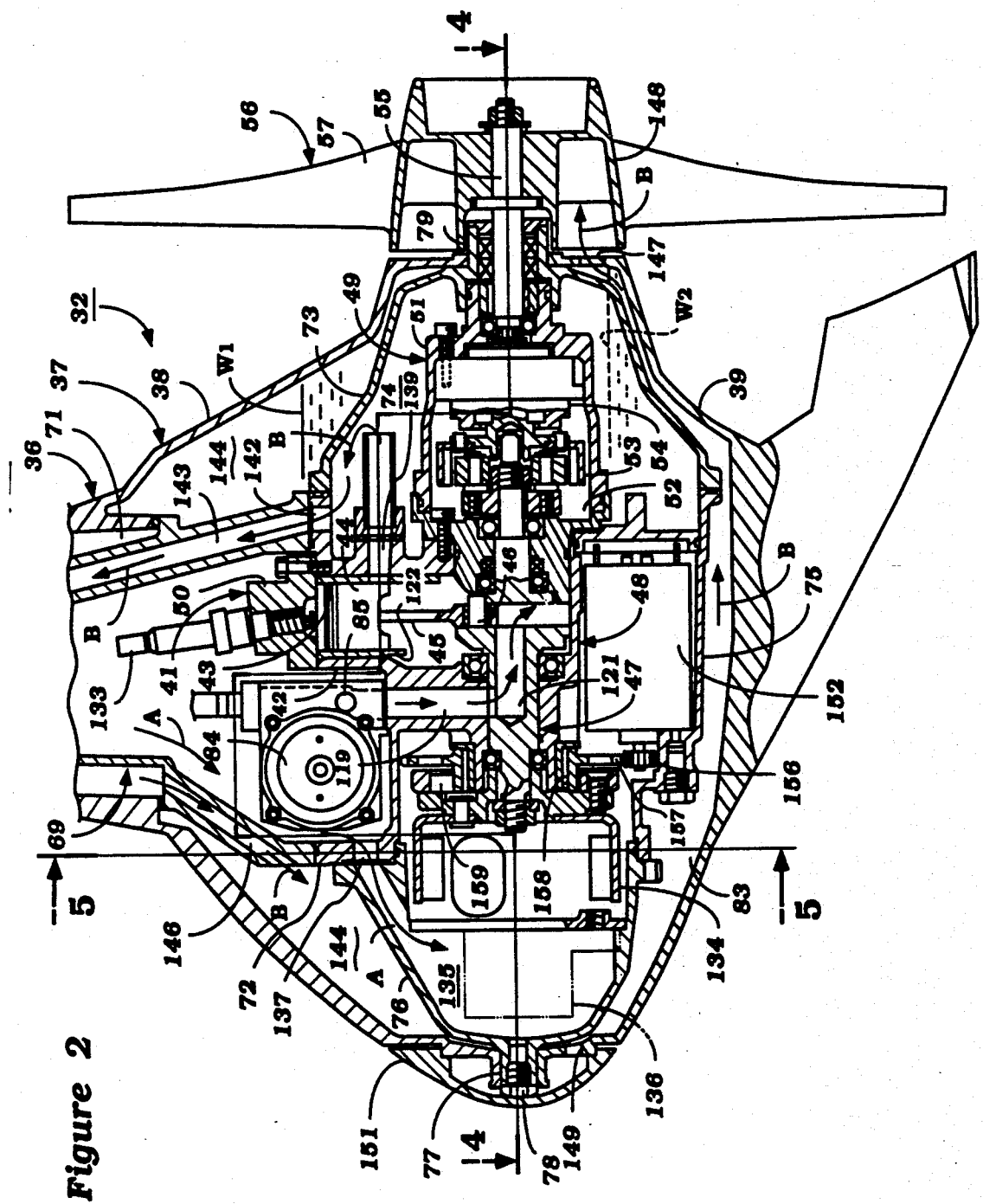
FIG. 2 is a cross sectional view taken through the lower unit of the outboard motor along a plane containing the axis of rotation of the propeller shaft.
Figure 4:
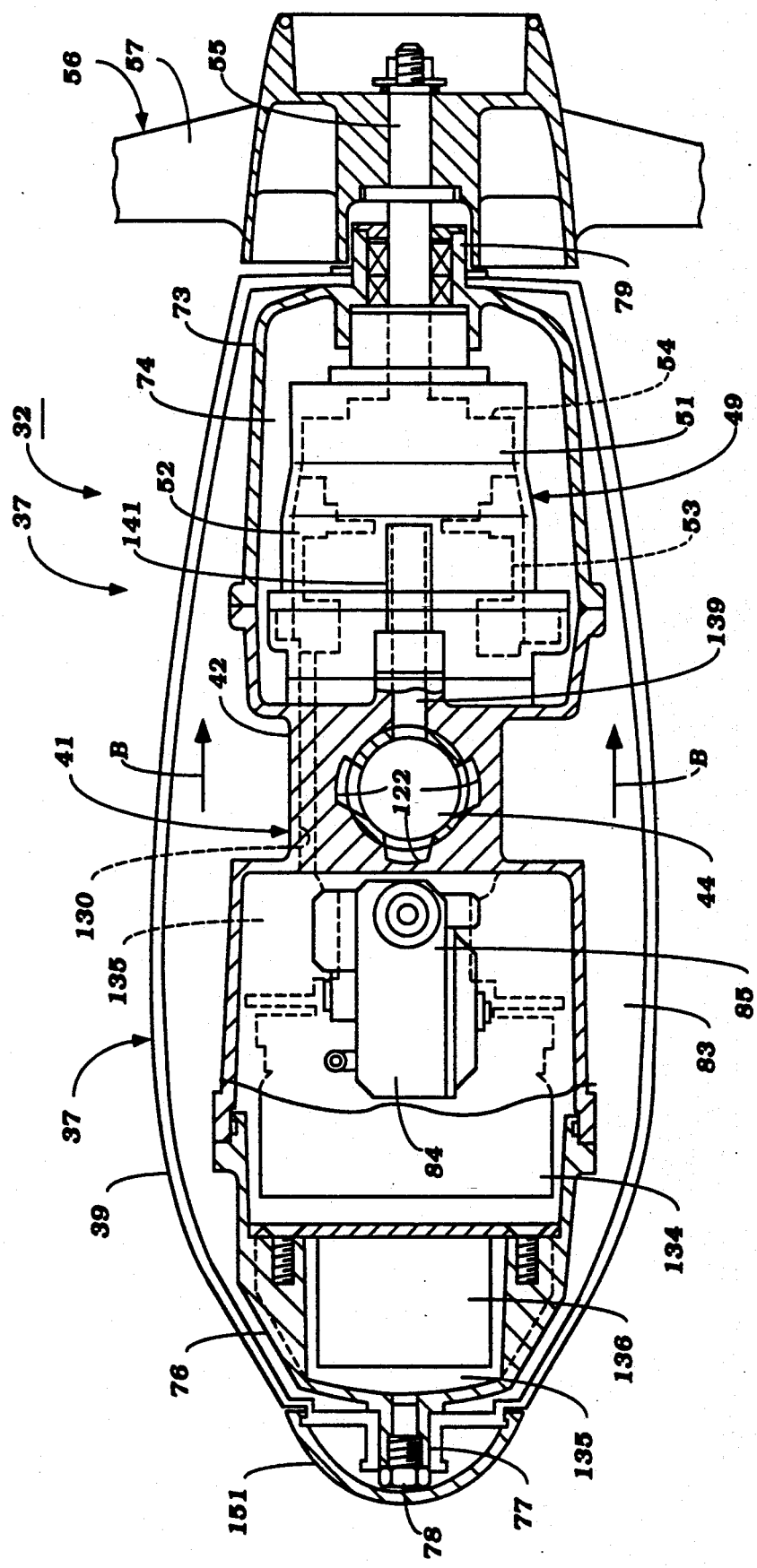
FIG. 4 is a cross sectional view taken along the line 4—4 of FIG. 2.
Figure 5:
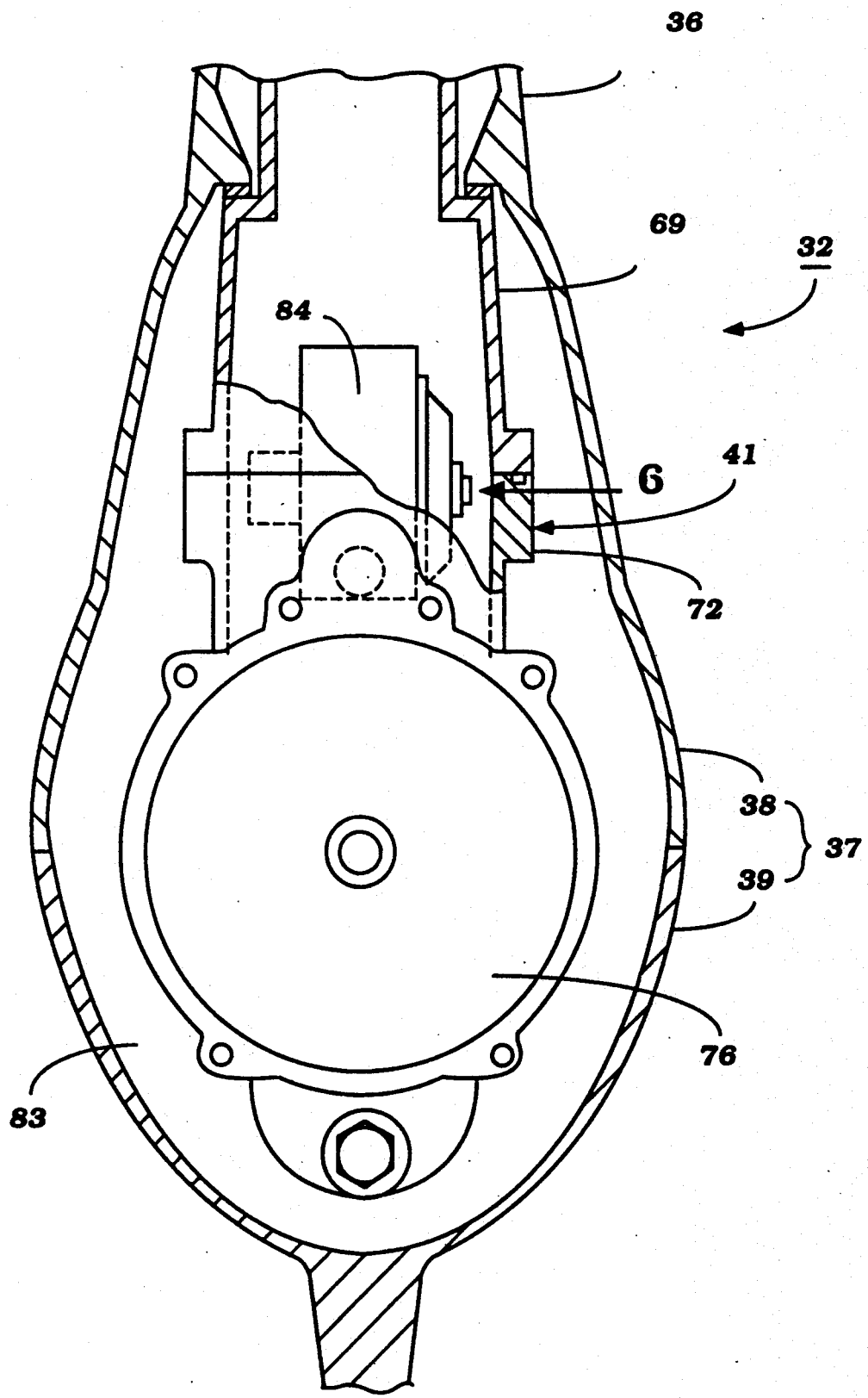
FIG. 5 is a cross sectional view taken along the line 5—5 of FIG. 2.
Figure 6:
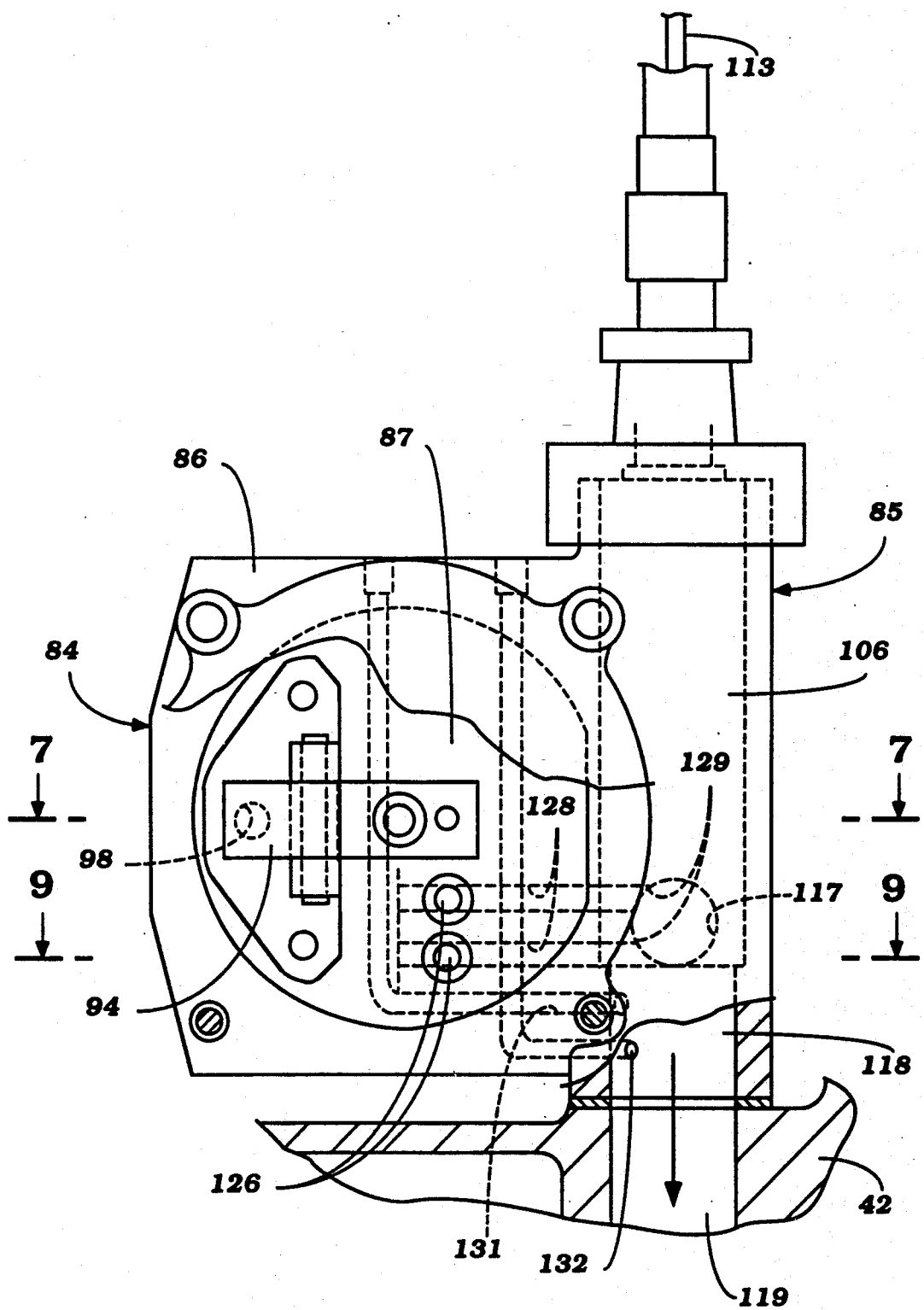
FIG. 6 is an enlarged view of the pressure regulator taken generally in the direction of the arrow 6 in FIG. 5, with portions being broken away and other portions being shown in section.
Figure 7:
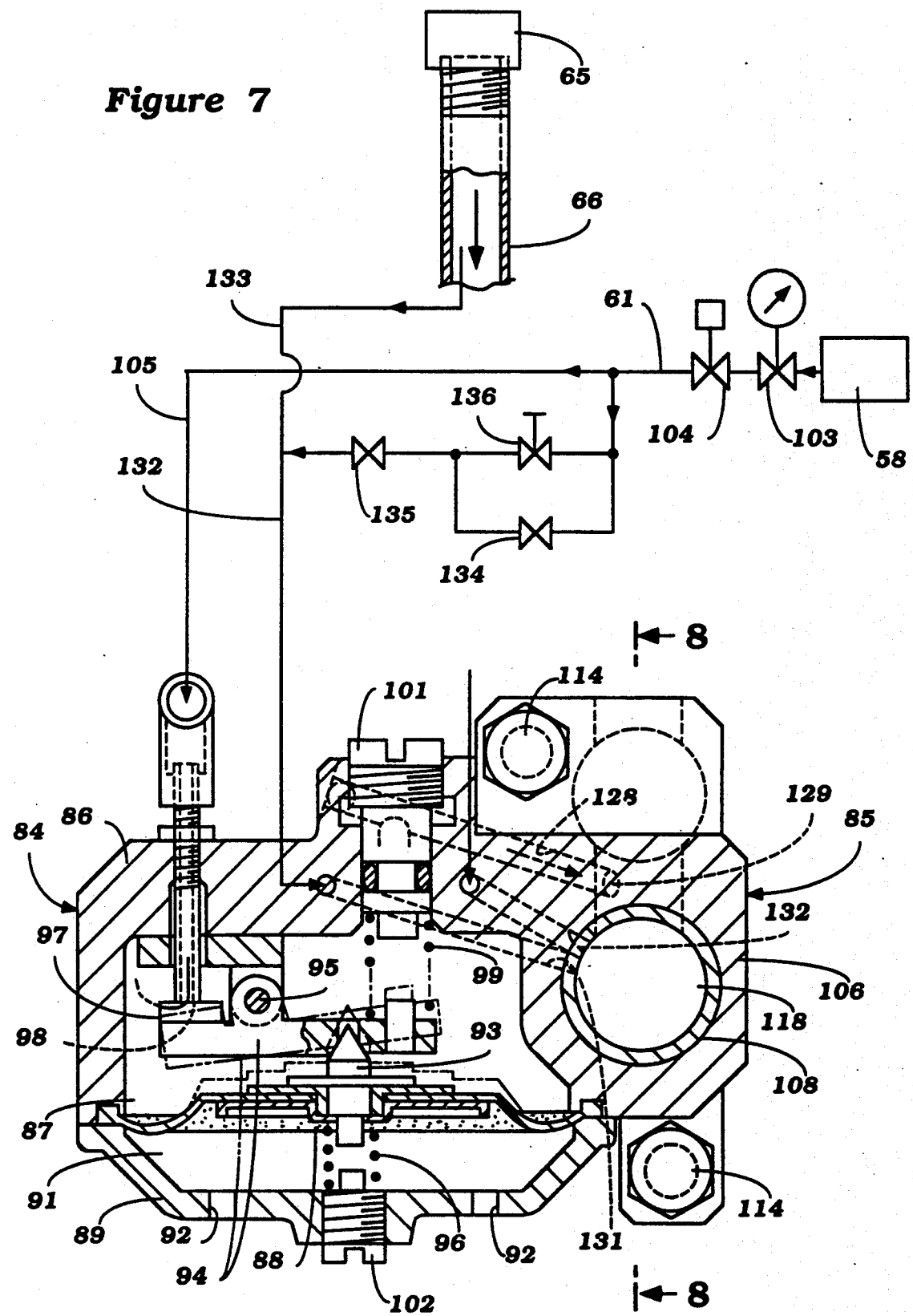
FIG. 7 is a cross sectional view taken along the line 7—7 of FIG. 6.
Figure 8:
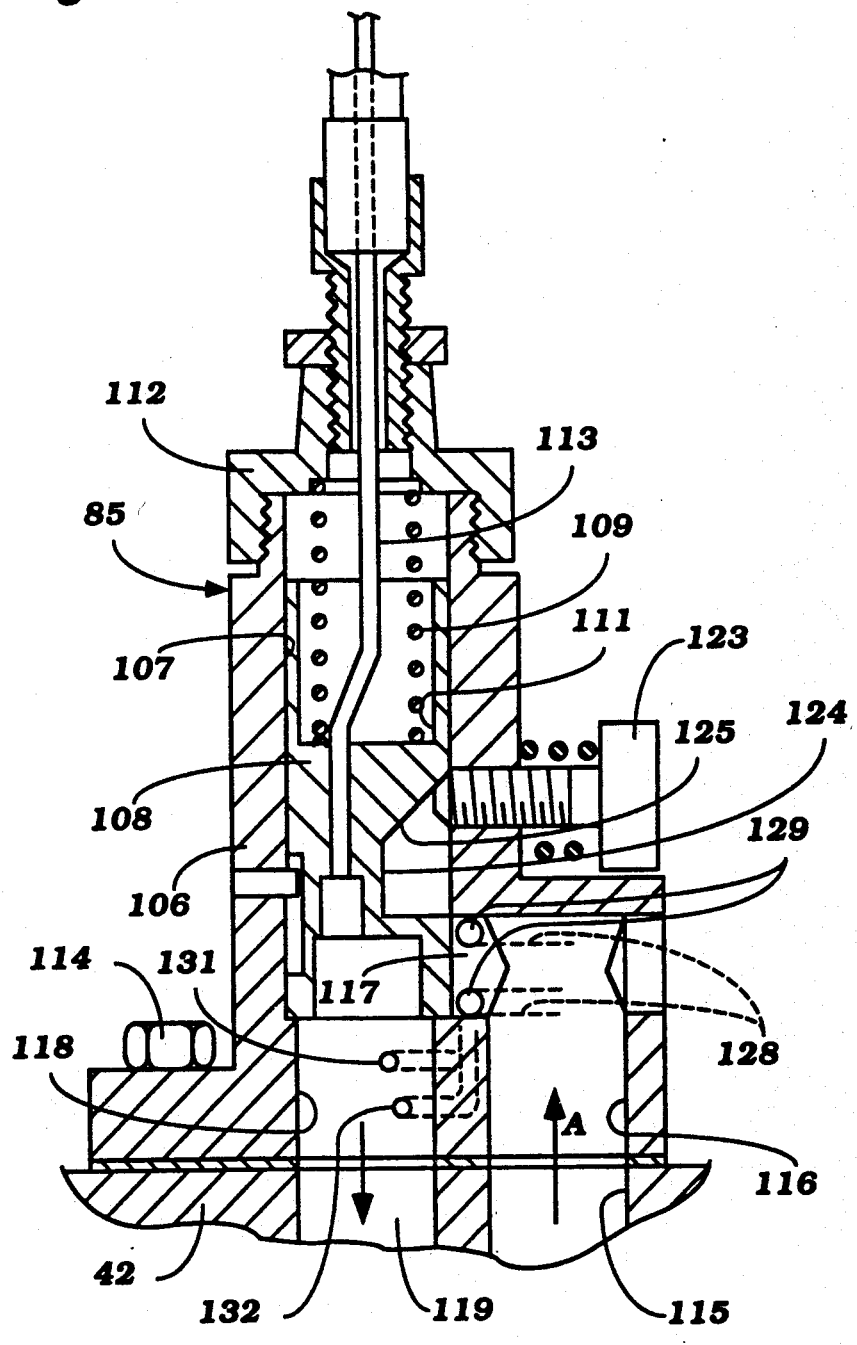
FIG. 8 is a cross sectional view taken along the line 8—8 of FIG. 7.
Figure 9:
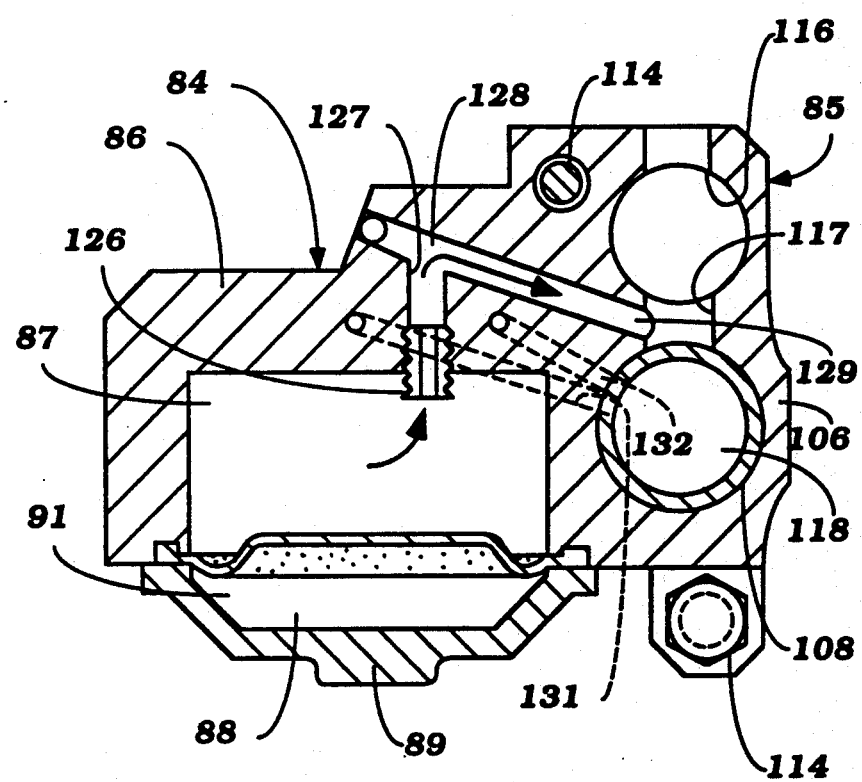
FIG. 9 is a cross sectional view taken along the line 9—9 of FIG. 6.

Referring now in detail additionally and primarily to FIGS. 2, 4 and 5, the internal combustion engine 41 is, in the illustrated embodiment of the single cylinder reciprocating type operating on a two stroke crankcase compression principle. Although the invention is described in conjunction with such an engine, it is to be understood that certain facets of the invention may be employed with engines of other types. However, the invention has particular application wherein the engine 41 has a relatively small size, in the illustrated embodiment the engine is of the displacement of about 10 cc and develops a relatively modest horsepower, approximately one-half horsepower. Of course, the invention can be employed with larger displacement engines.

The engine 41 includes a cylinder block 42 which is formed from a light weight material such as aluminum or an aluminum alloy and has an inserted cylinder liner 43 that defines a cylinder bore in which a piston 44 is supported for reciprocation. In the illustrated embodiment, the cylinder bore is disposed in a vertical plane, although other orientations are possible. The vertical orientation is, however, preferred because of the fact that this permits a more compact construction.

The piston 44 is connected to the upper end of a connecting rod 45 by means of a piston pin (not shown). The lower end of the connecting rod 45 is connected to a throw formed by a pin 46 of a crankshaft assembly, indicated generally by the reference numeral 47 for driving the crankshaft 47 in a well known manner. The crankshaft 47 is rotatably journaled, by the bearings illustrated but which have not been numbered for rotation within a crankcase 48, which may be formed integrally with the cylinder block 42.

Aft of the crankcase 48, there is provided a combined clutch and transmission assembly, indicated generally by the reference numeral 49 and which is comprised of an outer housing 51. This outer housing 51 is affixed, in a suitable manner, to the crankcase 48 and cylinder block 42 in an appropriate manner and defines an internal cavity 52. A centrifugal clutch assembly 53 is driven by the rear end of the crankshaft 47 and drivingly couples the crankshaft 47 to a planetary transmission 54 which provides a speed reduction to drive a propeller shaft 55.

A propeller, indicated generally by the reference numeral 56, is disposed rearwardly of the lower unit casing 37 and is coupled to the propeller shaft 55 in a suitable manner. The propeller 56 has vanes 57 for propelling the associated watercraft 22 through the body of water in which it is operating, in a well known manner.

The engine 41 operates on a gaseous fuel such as propane or the like which is contained under pressure in a removable canister 58 (FIG. 1) that is detachably connected to a quick-connect coupling 59 carried by the mounting bracket 25. As is well known, the fuel within the container 58 will be liquified, particularly when full, due to the high pressure and, in accordance with a feature of the invention, it is desirable to mount the container 58 on the hull of the watercraft 22 rather than on the outboard motor drive portion 32. In this way, the container 58 will not be subject to changes in attitude due to trim motion of the drive unit 32 and hence, there will be no likelihood that liquid fuel can enter into the fuel supply for the engine.

A flexible conduit 61 interconnects the coupling 59 and the fuel supply therefrom to the drive portion 32. A connector 62 (FIG. 3) is formed on the drive portion 32 so as to accommodate the flexible conduit 61. The fuel from the container 58 is regulated and is then supplied to the engine 41 in a manner which will be describer later, by particular reference to FIG. 6–9.

Air for the combustion of the engine 41 and for cooling certain components contained within the lower unit housing 37 is drawn through an appropriate air inlet opening in the upper unit 34 and enters a cavity 63 (FIG. 3) formed in a cylindrical housing member 64 that depends from the upper unit housing 34 and which is supported for the steering movement within the portion 31. An air filter element 65 is threaded to the upper end of an air supply tube 66 which is fixed to a bulkhead 67 formed at the lower end of the tubular member 64 by means of a lock nut 68. The tube 66 is threaded, at it lower end, into a generally funnel-shaped lower, internal housing member 69 which extends within a cavity 71 formed by the lower end of the housing 36 and flares out into the upper housing member 38 of the lower unit 37 (FIG. 2). The air flow path is indicated by the arrows A in the respective figures.

Cylinder block 42 has an outwardly extending flange portion 72 to which the lower end of the member 69 is affixed appropriately in a sealed fashion. In addition, an inner housing assembly comprised of a first member 73 is contained within the lower unit housing 37 and sealingly engages this flange 72 of the cylinder block 42 to provide a sealed chamber 74 in which the transmission 49 and major portion of the cylinder block 42 is contained. This housing assembly includes a further housing piece 75 and a nose piece 76 which, together, with the cylinder block 42 form a sealed chamber in which all components of the engine except for the engine cylinder head 50 and the engine charge forming system, to be described, are contained. This also includes the clutch and transmission housing 49. This inner housing assembly has a forwardly extending nose piece 77 that is affixed within a front wall of the lower unit housing 37 by means of a threaded fastener 78 and a rearwardly extending tail piece 79 that is affixed between the lower unit housing pieces 38 and 39 around the propeller shaft 55 as clearly shown in FIGS. 2 and 4.

The inner housing as thus far described thus defines an outer chamber 83 that is formed around this housing and within the interior of the housing of the lower unit 37. Water may fill this chamber, through openings to be described, to a water level $W_1$ which is slightly lower than the water lever W in which the outboard motor drive portion 32 is submerged when attached to the hull of the watercraft 22, for a reason which will be described.

A charge forming system for the engine 41 will be described now by particular reference to FIGS. 6–9, although it is to be understood that certain of these components of this system appear in other figures. This charge forming system includes a suction pressure regulator, indicated generally by the reference numeral 84 and which has been previously referred to, and a throttle valve assembly 85. In this embodiment, a common housing piece 86 forms both a portion of the pressure regulator 84 and a portion of the throttle valve assembly 85. The housing piece 86 defines a regulating chamber 87 that is formed in one of its faces and across which a regulating diaphragm 88 is affixed by means of a cover piece 89. The cover piece 89 and diaphragm 88 define an atmospheric chamber 91 that is exposed to atmospheric pressure through vent passages 92.

The diaphragm 88 carries a pressure applying member 93 that bears against a regulating lever 94 which is, in turn, pivotally supported within the housing piece 86 by means of a pivot pin 95. A coil compression spring 96 is contained within the atmospheric chamber 91 and urges the diaphragm 88 in a direction to pivot the lever 94 to a position wherein a valve member 97 contained thereby will open a fuel delivery port 98 to admit pressurized fuel to the chamber 87. A further coil compression spring 99 is acted upon by an adjusting screw 101 so as to urge the regulating lever 94 toward its closed position. Hence, the loading of the springs 96 and 99 will determine the regulated pressure. The spring 96 may be adjusted by means of an adjusting screw 102.

Hence, the regulator 84 will act to maintain a constant pressure of regulated fuel within the regulating chamber 87 in relation to the suction pressure in the induction system.

Fuel is delivered from the container 58 to the regulating chamber 87 through the conduit 61 which has been previously described. In or upstream of the conduit 61 there is provided a first pressure regulator that reduces the fuel pressure to near atmospheric pressure and a manual shut-off valve 104 so as to shut off the supply of gaseous fuel to the conduit 61 when it is desired to discontinue operation of the outboard motor 21.

The conduit 61 communicates with an internal conduit 105 which is shown only schematically in the figures and which depends through the housing 36 to the regulator assembly 84.

Continuing to refer to FIG. 6–9, the throttle valve assembly 85 includes a throttle body 106 that is formed integrally by the housing piece 86 and which generally comprises a cylindrically upwardly extending projection thereof. A first bore 107 of the throttle body 106 slidably supports a throttle valve piston 108. The piston 108 is urged toward its closed position by means of a coil compression spring 109 that is contained within a recess 111 of the throttle piston 108 and which is engaged at its other end with a closure piece 112 that is threaded to the throttle body 106. A boden wire cable 113 is connected in an appropriate manner to the throttle piston 108 and may be operated externally by means of a throttle lever (not shown) for moving the throttle piston 108 from its closed or idle position as shown in the figures to a raised or open position.

The throttle valve 85 and pressure regulator 84 are affixed to the cylinder block flange 42 by means of a pair of threaded fasteners 114. The cylinder block 42 is provided with a passageway 115 to which atmospheric air is admitted from the area within the member 69 from the atmospheric air source already described. This air then flows upwardly through a passageway 116 formed in the housing piece 86 and intersects a cross drilled passageway 117. A further bore 118 is formed in the housing piece 86 in alignment with the bore 107 and is also intersected by the cross drilled passageway 117. The throttle piston 108 opens and closes the cross drilled passageway 117 and thus controls the amount of air that can flow into the bore 118 and into an intake port 119 formed in an upper surface of the cylinder block 42.

As may be best seen in FIG. 2, the cylinder block intake port 119 communicates with a drilled passageway 121 formed in the crankshaft 47 so as to admit air and fuel, as will be described, to the crankcase chamber defined by the crankcase 48. This charge is drawn inwardly on upward movement of the piston 44 and is compressed during its downward movement for transfer through scavenge passages 122 to the area above the piston 44 in a manner will known in two cycle engine practice.

An adjusting screw 123 is threaded into the throttle body 106 and is received in a recess 124 formed in the throttle piston 108 for holding the throttle piston 108 against rotation within the bore 107 and also for limiting the degree of maximum opening of the throttle piston 108. In addition, the adjusting screw 123 cooperates with a ramp portion 125 of the recess 124 so as to set the idle position of the throttle piston 108.

Fuel is supplied from the regulator chamber 87 to the cross drilled passageway 117 for main running operation through a main fuel supply circuit. This includes a pair of metering jets 126 that are positioned within the regulating chamber 87 and which communicate with a pair of cross drilled passageways 127 and 128 which interconnect with the cross drilled passageway 117 through main delivery ports 129.

The system is also provided with an idle fuel/air arrangement which, in the illustrated embodiment, includes an idle discharge passageway 131 that intersects the bore 118 below the throttle piston 108. The passageway 131 receives a mixture of fuel and air through a conduit 132. Air is supplied to the conduit 132 from the tube 66 through a conduit 133.

Fuel is supplied to the conduit 132 through a pair of fixed throttle members 134 and 135 and an adjustable throttle member 136 so as to control the idle fuel flow for the engine.

It has been previously noted that the outboard motor and particularly the propulsion unit portion 32 is supported for trim movement. This trim movement occurs along a plane which, in this embodiment, is coincident with or parallel to the plane in which the diaphragm 88 is positioned. Because of this, the diaphragm 88 will not be influenced by changes in gravitational force due to the tilt movement and hence, the amount of fuel and air supplied to the engine will be constant regardless of the trim condition of the propulsion unit 32.

As is well known, it is the conventional practice to lubricate a two cycle engine by mixing lubricant with the fuel. However, since the engine 41 is fueled by a gaseous fuel, this lubricating expedient is not practical. Therefore, the throttle mechanism 85 is also provided with a lubricant port 132 that intersects the bore 118 and to which lubricant is supplied from a remotely positioned lubricant source in any appropriate manner.

Figure 3:
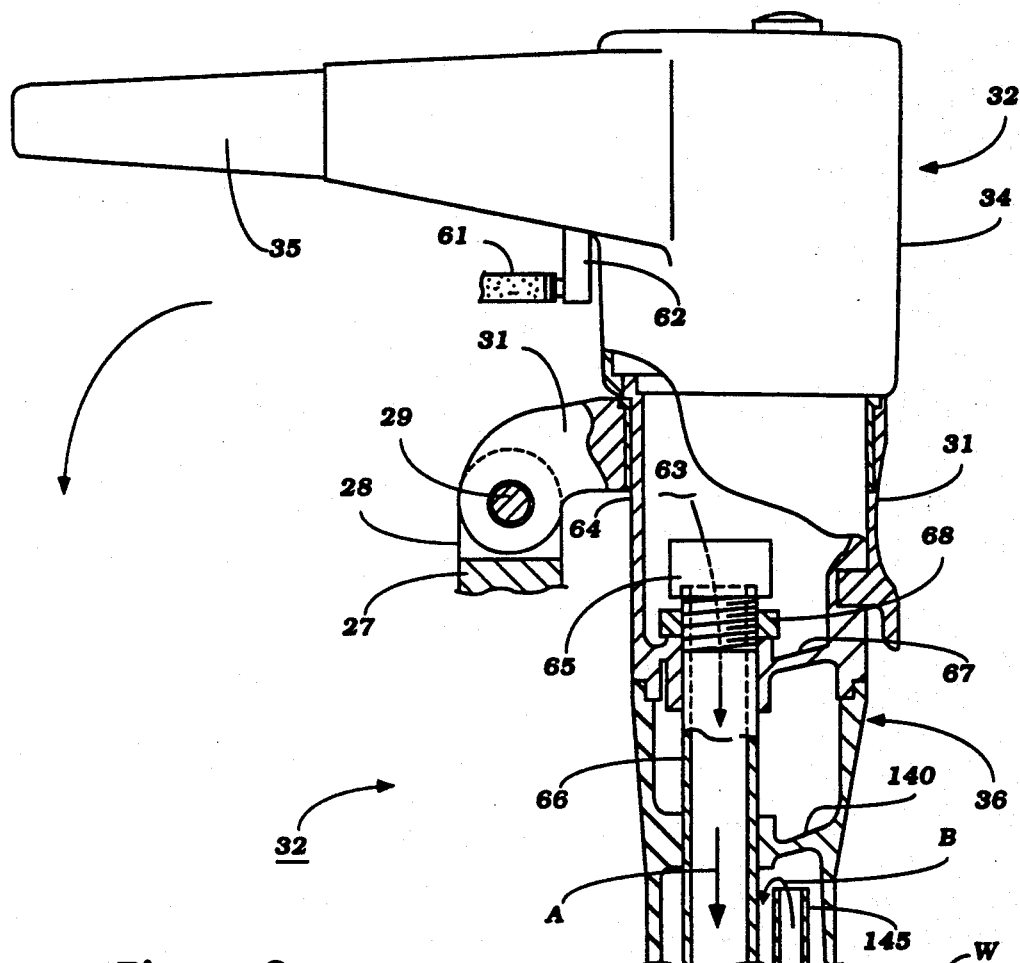
FIG. 3 is an enlarged side elevational view of the upper portion of the outboard motor, with a portion broken away so as to more clearly show the air and exhaust flow paths through this portion of the outboard motor.

Referring now primarily to FIG. 2 and 3, a spark plug 133 is mounted in the cylinder head 50 of the engine 41. This spark plug 133 is contained within the member 69 and hence will be cooled by the air flow path A through this system as aforedescribed. The spark plug 133 is fired by means of an ignition system that includes a flywheel magneto assembly 134 that is affixed to the forward end of the crankshaft 42 and which is contained within a chamber 135 formed by the inner housing assembly, already described. The flywheel magneto assembly 134 provides a charging and pulser signal to an ignition circuit, shown schematically at 136 and also contained within the chamber 135 for firing of the plug 133 in a known manner. An appropriate spark plug wire extends from the circuit 136 to the spark plug 133 for this purpose. It should be noted that the chamber 135 is also supplied with air flow A through a port 137 formed in the cylinder block 42 adjacent the pressure regulator 84 and as clearly shown in FIG. 2.

The engine 41 is also provided with an exhaust system, which exhaust system is designed so that the exhaust gases will circulate around a portion of the exterior of the engine and particularly the cylinder block 42 so as to insure against excess cooling of the engine 41. As is readily apparent, the fact that the engine 41 is contained within the lower unit 37 places it at least in part below the water level and hence, even though the water does not come in direct contact with the engine 41, it will provide some substantial cooling for it. In order to maintain a more uniform and slightly elevated temperature for the engine 41, its exhaust system provides this heating.

The cylinder block 42 is formed with a rearwardly facing exhaust port 139 from which exhaust gases are delivered to the chamber 74 through a relatively short rearwardly extending exhaust pipe 141. Hence, the exhaust gases, which flow in the direction of the arrows B, will pass across the outer periphery of the cylinder block 42 and heat it. The exhaust gases then pass upwardly through an opening 142 in the cylinder head flange 137 and pass into a conduit 143 that it formed by the member 69. This conduit 143 is isolated from a chamber 144 that is formed within the outer housing 37 above the water lever $W_1$ therein. The exhaust gases then flow upwardly through the passage 143 of the member 59 and are discharged into the chamber 71 formed by the outer periphery of the member 69 and the inner periphery of the member 36 by means of a pipe 145. These exhaust gases then flow in a reverse direction downwardly through a further passage 146 formed in the forward portion of the member 69 and enter the chamber 144 at the forward portion thereof. An internal bulkhead 140 of the member 36 closes the upper end of the chamber 71 so as to cause the exhaust gases to be redirected downwardly to the passage 146. These exhaust gases and the pressure thereof will cause the water level to fall further from the point $W_1$ to a point $W_2$ and open an exhaust gas discharge passage 147 that is formed in a rear wall of the housing piece 29 and in proximity to the hub 148 of the propeller 56. Hence, the exhaust gases will not only heat partially the engine 41 but will be silenced due to their circuitous path and the passage through the water in the interior of the lower unit housing 37 before exit to the atmosphere.

Heat generated by the operation of the centrifugal clutch assembly 53 will cause the air in the housing 51 to expand and this pressure is relieved through a passage 130. The heated air will expand through the passage 130 to the forward side of the cylinder block 42.

It should be noted that a further opening 149 is provided in the front of the lower unit housing 37 and is covered by a cover plate 151. The opening 149 serves the purpose of permitting water to drain from the lower unit 37 when the outboard motor drive portion 32 is pivoted out of the water.

In order to start the engine 41, there is provided an electrical starter in the form of an electric motor 152 that is positioned within the inner housing and specifically its member 75 and beneath the crankcase 48. This motor 152 is supplied with electrical power from a battery 153 (FIG. 1) that is mounted on the mounting bracket 25 by means of a support assembly 154 and fasteners 155. A suitable starting switch (not shown) is incorporated for energizing the motor 152 from the battery 153 in a well known manner.

The motor 152 has a starter gear 156 (FIG. 2) that is enmeshed with a gear 157 journaled on the crankcase 48 by means of a bearing 158. A one-way clutch 159 couples the gear 157 to the flywheel 134 for cranking the crankshaft 47 and for permitting the crankshaft 47 to overrun the gear 157 once the engine has started.

Figure 10:
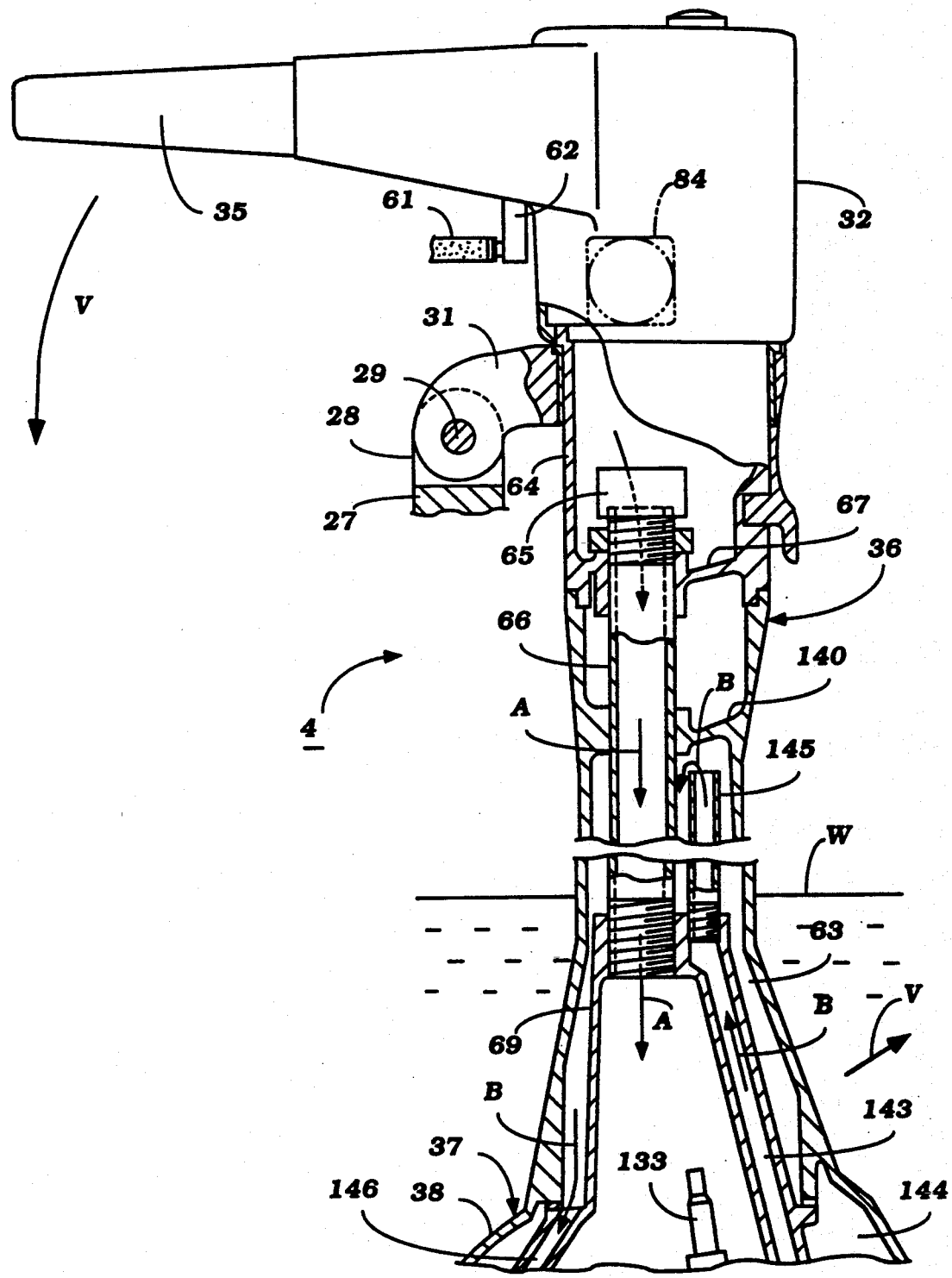
FIG. 10 is a side elevational view, with a portion broken away, in part similar to FIG. 3, and shows another embodiment of the invention.

Embodiment of FIG. 10

In the embodiment of the invention as thus far described, the pressure regulator 84 was mounted as a unit with the throttle body 85 and supported in the lower unit 37. It is, of course, possible to mount the pressure regulator in other locations and FIG. 10 shows an arrangement wherein the pressure regulator 84 is mounted in the upper housing 34. However, in this embodiment, like the embodiment of FIGS. 1-9, the pressure regulator 84 is supported so that its diaphragm is in a plane that is parallel to or coincident with the plane of tilting movement of the outboard motor drive portion 32, indicated by the arrow V in the various figures. As a result, changes in the degree of submersion of the propeller 56 will not affect the fuel flow since the regulation will be unaffected by the trim or tilt condition of the propulsion unit 32. In all other regards, this embodiment is the same as the previously described embodiment and for that reason, further description of it is believed to be unnecessary and the parts illustrated which are the same as those of the previously described embodiment have been identified by the same reference numerals.

Figure 11:
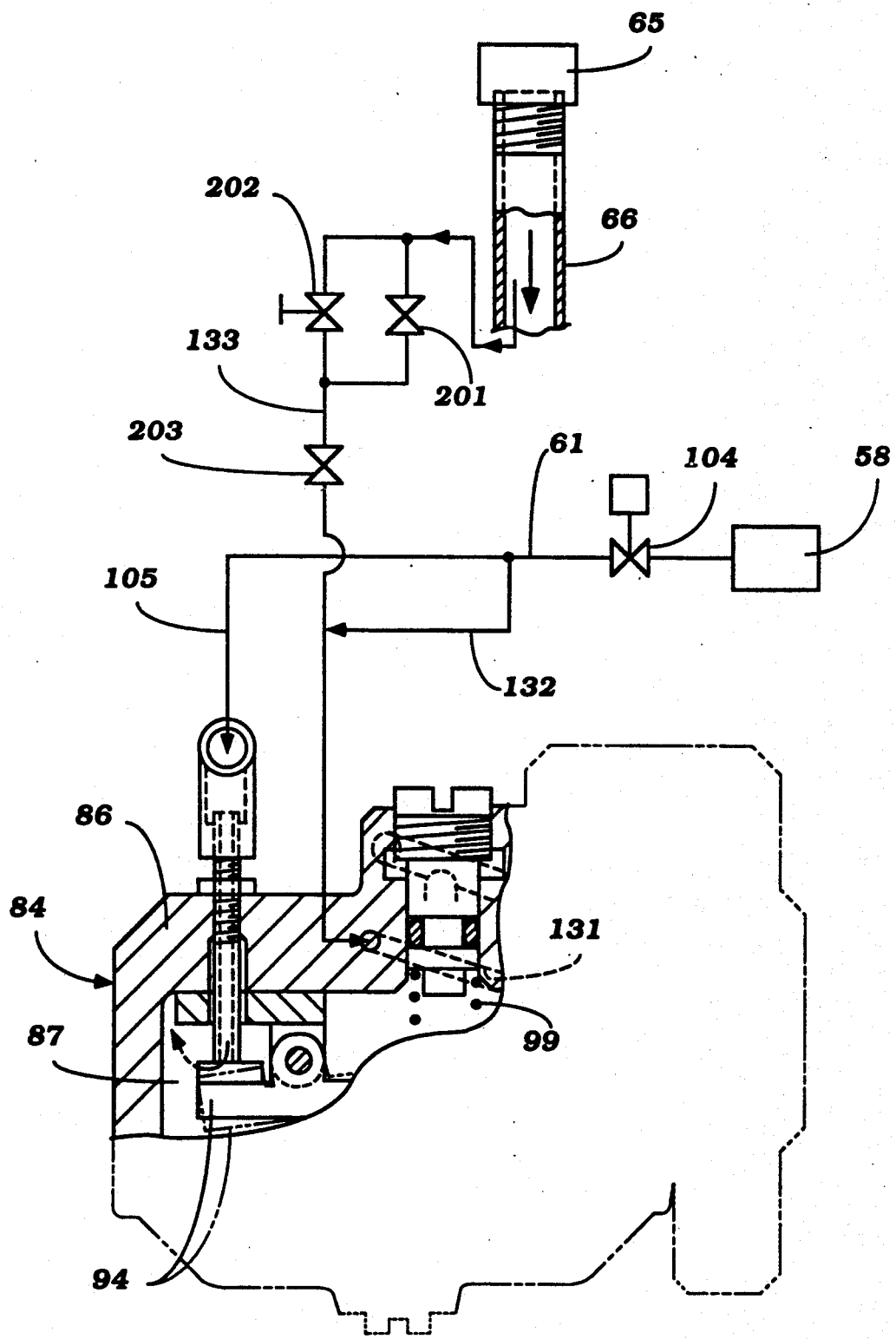
FIG. 11 is a view in part similar to FIG. 7 and shows another form of fuel/air controls arrangement in association with the pressure regulator.

Embodiment of FIG. 11

In the embodiment of FIGS. 1-9, the idle circuit for the engine 41 provided an arrangement for permitting substantially unthrottled air to flow to the engine and the amount of fuel supplied to the engine was throttled. FIG. 11 shows another embodiment, which is substantially the same as the embodiment of FIGS. 1-9 but shows an arrangement wherein the fuel supplied to the idle circuit is not throttled but the air supply is throttled so as to vary the air/fuel ratio. Because of these similarities, components which are the same as the previously described embodiment have been identified by the same reference numerals and only the differences will be described. Also, for the same reason only a partial figure (FIG. 11) which corresponds to FIG. 7 of the preceding embodiment, is believed to be necessary to enable those skilled in the art to understand the invention of this embodiment.

In this embodiment, the fuel for the idle circuit is supplied directly from the conduit 132 without any control valve for fuel supply except for the main shut off valve 104, as previously described.

In the air circuit, on the other hand, there is provided in the conduit 133 a fixed throttle valve 201 and a variable throttle valve 202 which supply air to the conduit 133. A further fixed throttle 203, which may be comprised of an air metering jet, is provided between the conduit 133 and the idle air passage 131 of the throttle body 85. Hence, the fuel supply is unthrottled but the amount of fuel/air mixture supplied is controlled by changing the adjustable throttle 202 and setting the fixed throttles 201 and 203 in the desired proportion. In all other regards, this embodiment is the same as those previously described.

Figure 12:
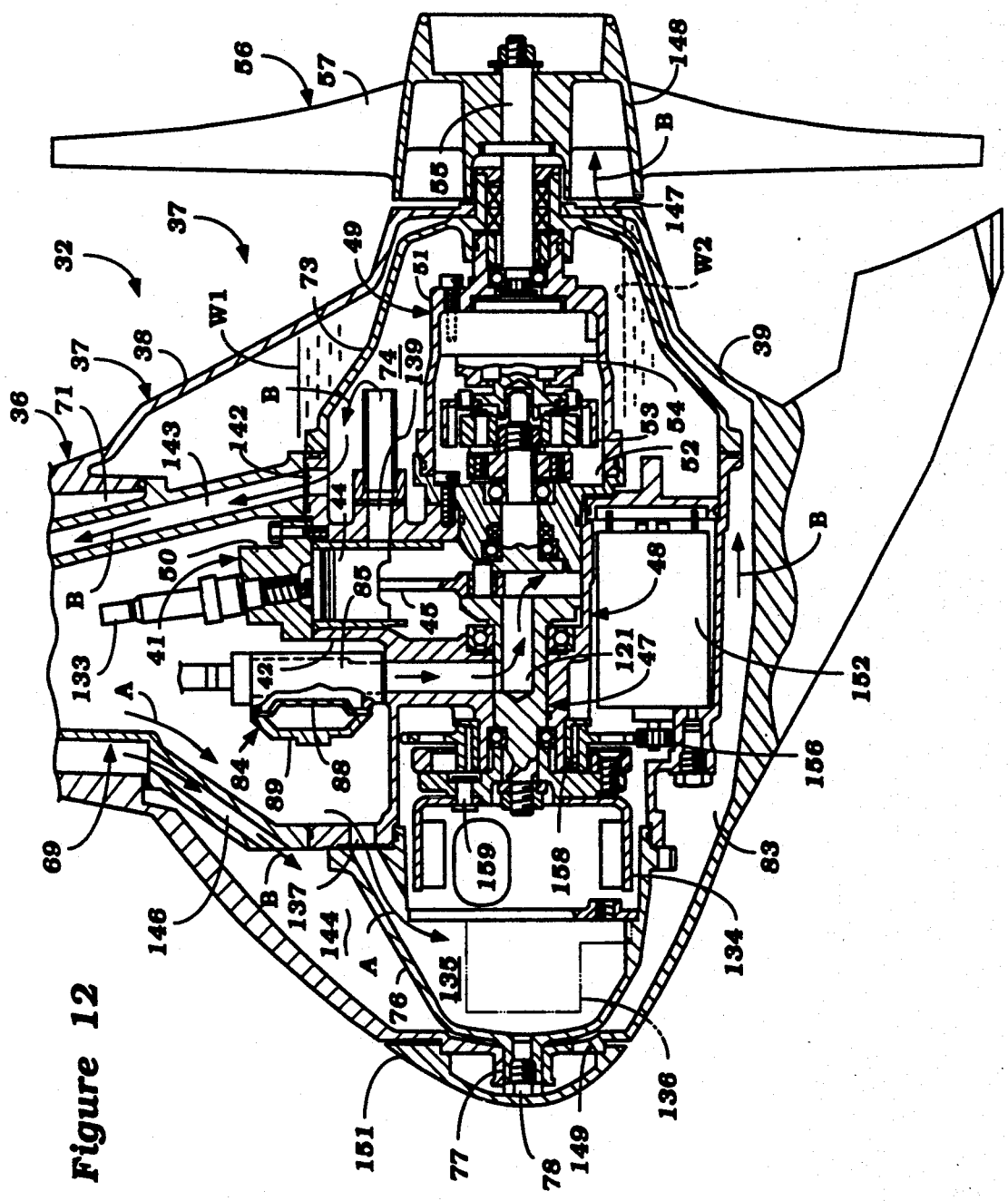
FIG. 12 is cross sectional view, in part similar to FIG. 2, and shows a further embodiment of the invention.
Figure 13:
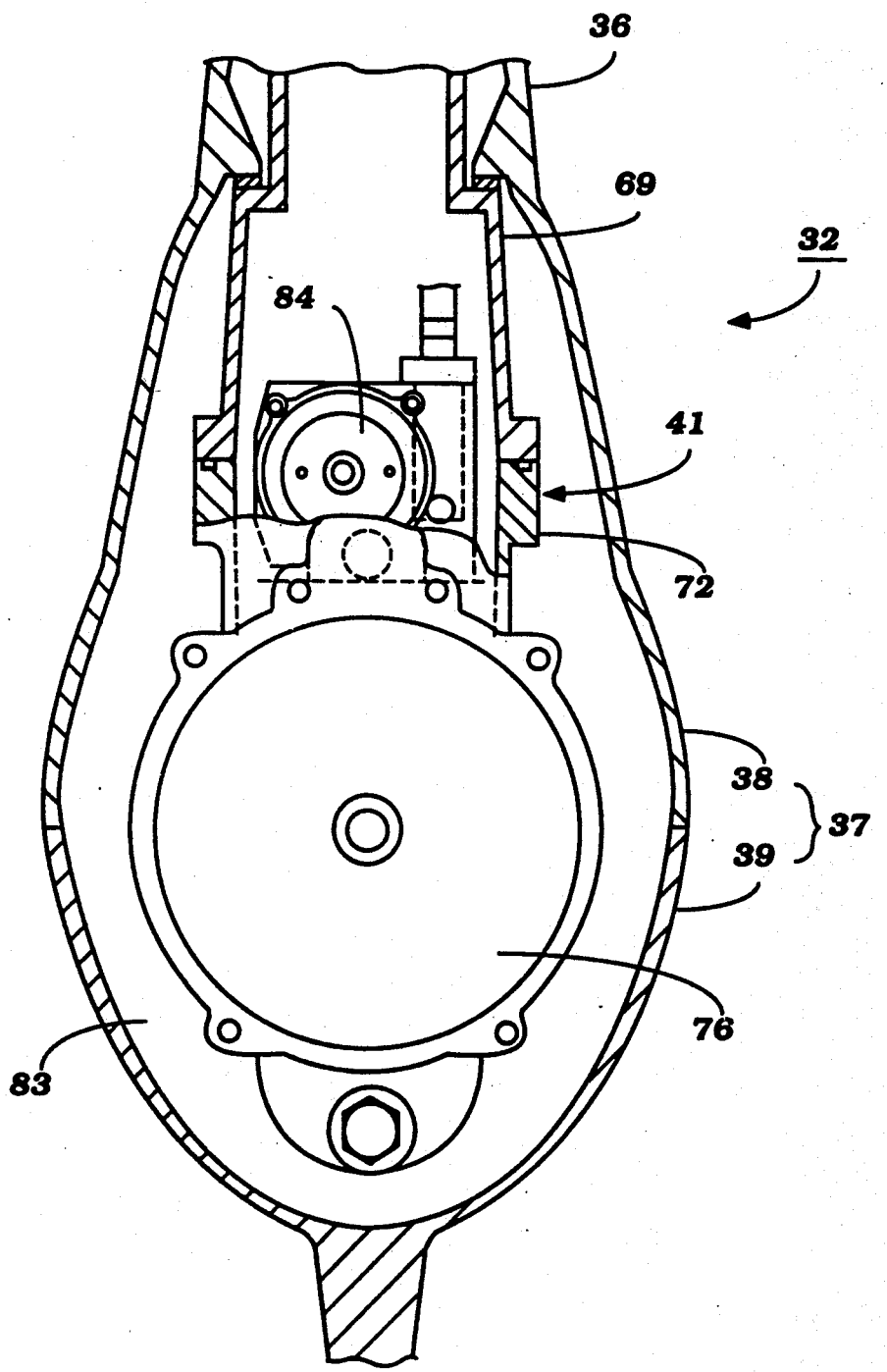
FIG. 13 is a cross sectional view of this embodiment along a plane generally perpendicular to the plane of FIG. 12, and with portions further broken away so as to show the relationship of the pressure regulator to the other components.
Figure 14:
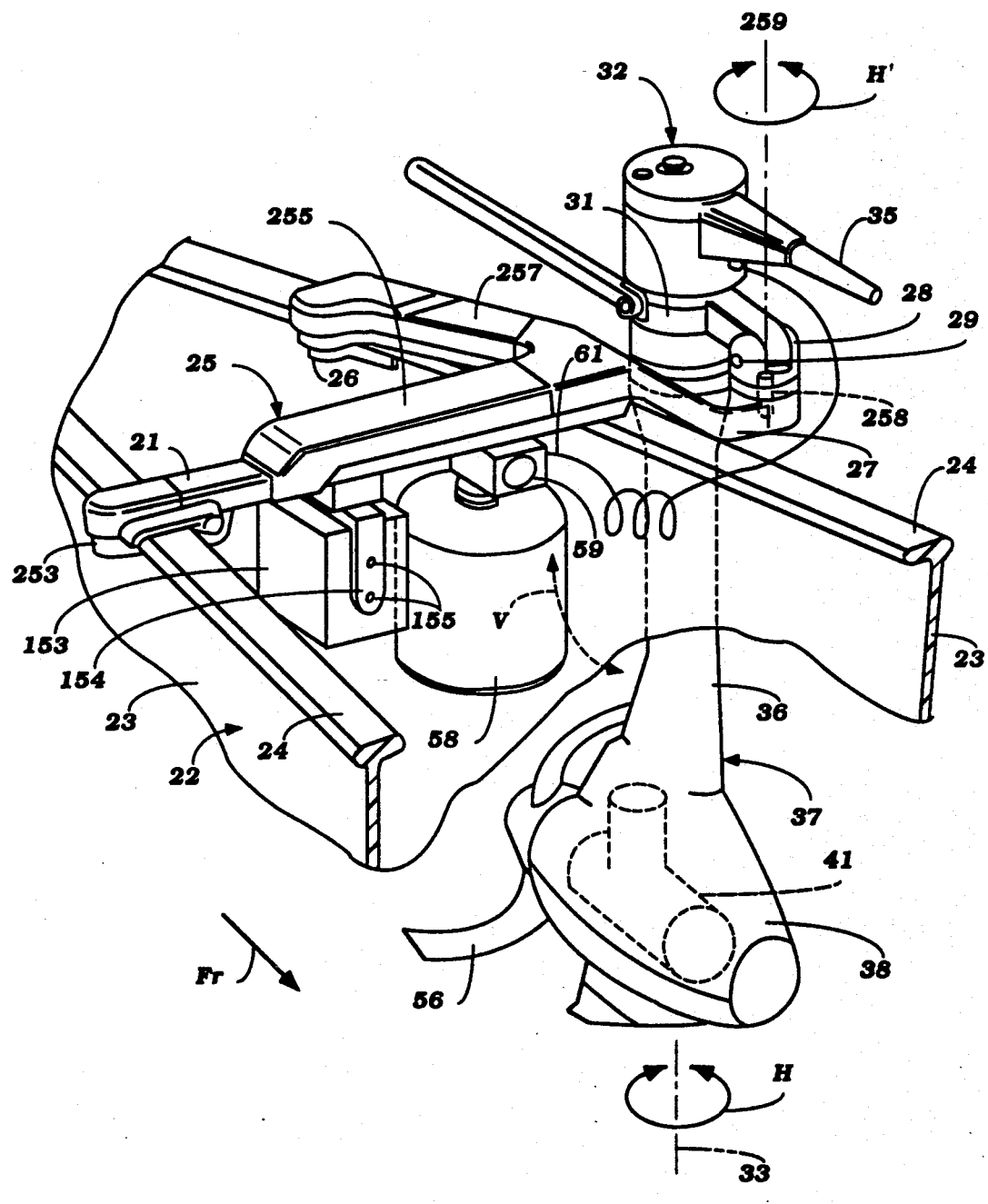
FIG. 14 is a perspective view, in part similar to FIG. 1, and shows yet another embodiment of the invention.
Figure 15:
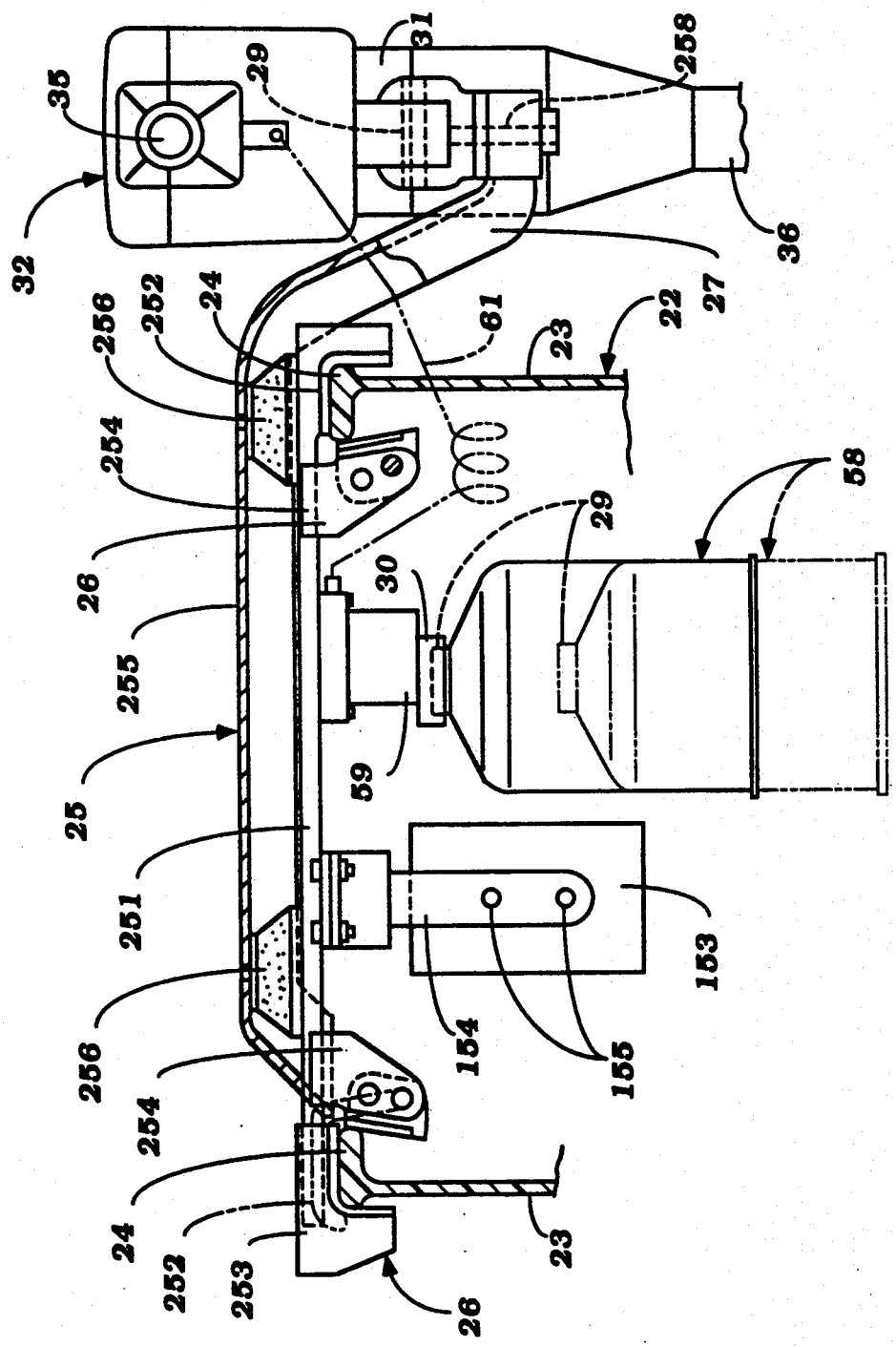
FIG. 15 is a front elevational view of the mounting arrangement for the outboard motor, with portions broken away.
Figure 16:
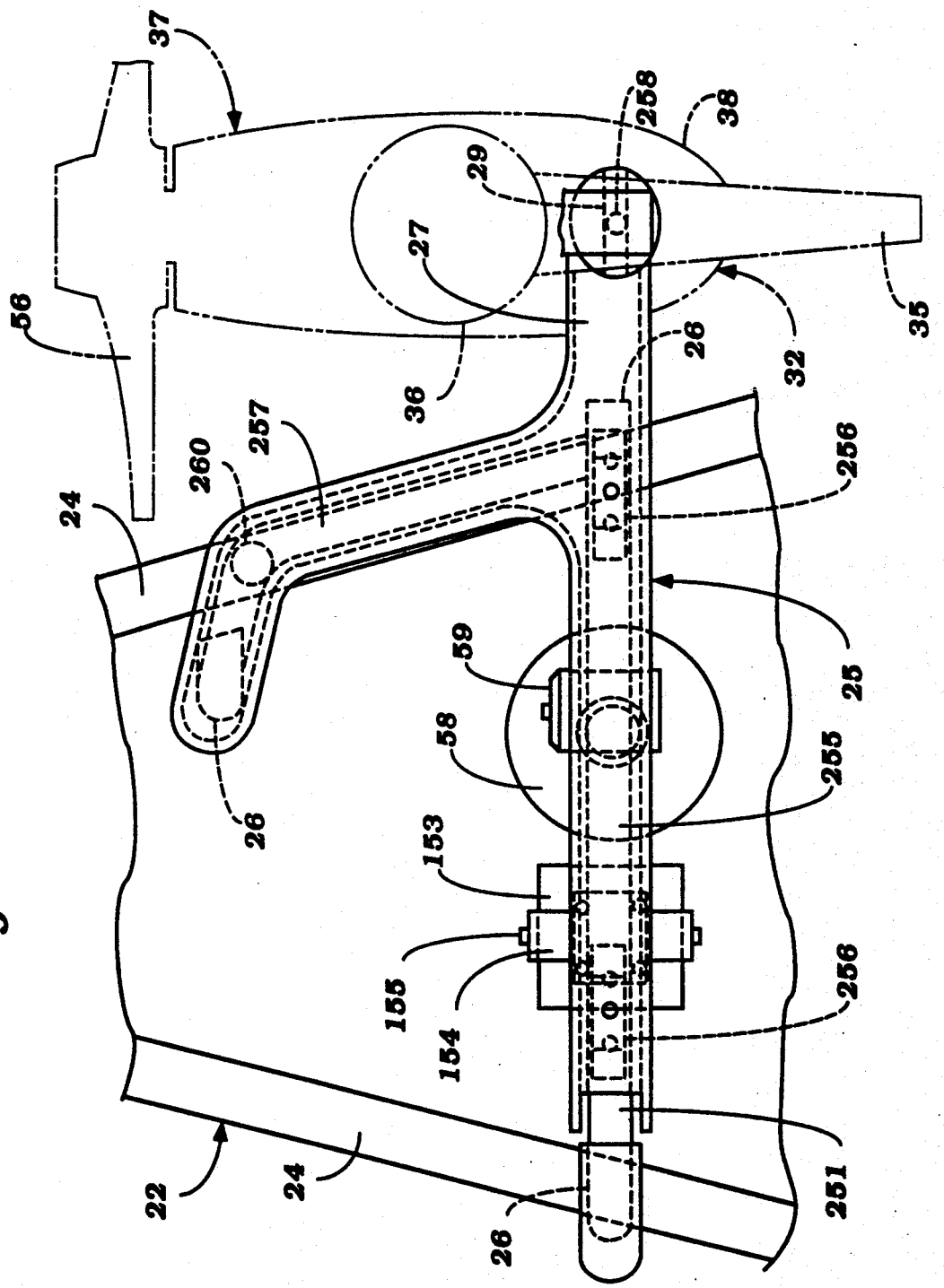
FIG. 16 is a top plan view of this embodiment.

Embodiment of FIGS. 12 and 13

In all of the embodiments as thus far described, the drive portion 32 of the outboard motor 21 has its trim changed by pivotal movement about the pivot pin 29 which extended transversely to the axis of rotation of the propeller shaft 56. This is the conventional type of trim and tilt motion employed with more conventional outboard motors. However, it is also possible and, in some instance even desirable, to achieve the tilt and trim adjustment by having the outboard motor drive portion 32 pivot about an axis that extends parallel to the axis of rotation of the propeller shaft 55. This may be done by turning the pivot pin 29 so that it is rotated 90° from the position shown in FIG. 1 and this can be done in any of a wide variety of fashions.

It has been previously noted that it is desirable to mount the pressure regulator 84 in such a manner that its regulating diaphragm lies in a plane that is parallel to or coincident with the plane of tilt and trim movement of the outboard motor. Therefore, in this embodiment, the pressure regulator 84, which is also mounted in a manner similar to the embodiment of FIGS. 1-9, is rotated through 90° as shown in FIGS. 12 and 13 so that it will be unaffected due to the pivotal movement of the outboard motor to change the trim and effect tilting. In all other regards, this embodiment is the same as the embodiment of FIGS. 1-9 and, for that reason, components which are the same have been identified by the same reference numerals and will not be described again. Also, it is to be understood that the alternate location of FIG. 10 may be employed in conjunction with this form of tilt and trim operation and this location can be chosen so long as the regulator 84 is rotated in through 90°, as with the embodiment of FIGS. 12 and 13.

Embodiment of FIGS. 14-18

As was noted in conjunction with the description of the embodiment of FIGS. 1-9, the mounting portion 25 of the outboard motor 21 permits detachable connection of the outboard motor to the gunnels 24 of the hull of the watercraft 21. As was also mentioned earlier, the mounting structure may be best understood by reference to FIGS. 14-16 and in this regard, the embodiment of FIGS. 14-18 is the same as the previously described embodiments. It will be noted that the mounting portion 25 includes a generally L-shaped mounting bracket 251 which may be conveniently formed from sheet metal or the like and which carries at its long legs cradle portions 252 that are adapted to extend over the gunnels 27. A locking mechanism, previously mentioned and identified by the reference numeral 26, is provided which will detachably clamp the mounting portion 251 to the watercraft 22. This locking assembly 26 includes a fixed retaining member 253 that is adapted to be positioned outboard of the gunnels 24 and hull sides 23 and a movable portion 254 that achieves the latching to the gunnels.

An upper member, indicated generally by the reference numeral 255, has a generally complementary configuration and provides the outwardly extending arm 27 to which the drive portion 32 is mounted in the manner previously described. The upper portion 255 is resiliently supported on the portion 251 by means of a plurality of elastic isolators 256. The short leg of the mounting portion 251 also carries a construction which cooperates with the gunnel 24 rearwardly of the drive portion 32 and which also has a detachable latching mechanism 26. The cover plate 255 has a similar overlying portion 257 and a further round elastic isolator 260 is interposed between these short legs of the portions 251 and 255.

In this figure, the aforedescribed pivotal arrangement for permitting rotation of the drive unit 32 relative to the mounting bracket portion 27 is illustrated and identified at 258. The pivot support 258 is comprised of a vertically extending pivot bolt that is affixed to the portions 28 and 27, respectively, but permits rotation about a vertically extending axis shown by the phantom line 259. In order to store the outboard motor and particularly the drive unit 32, the entire assembly is rotated about the pivot bolt 258 to a position wherein the propeller shaft is perpendicular to the relationship shown in FIG. 14. The entire unit is then pivoted up about the pivot pin 29 and the assembly may then be swung again around the pivot pin 258 to swing the drive unit 32 inwardly.

Figure 17:
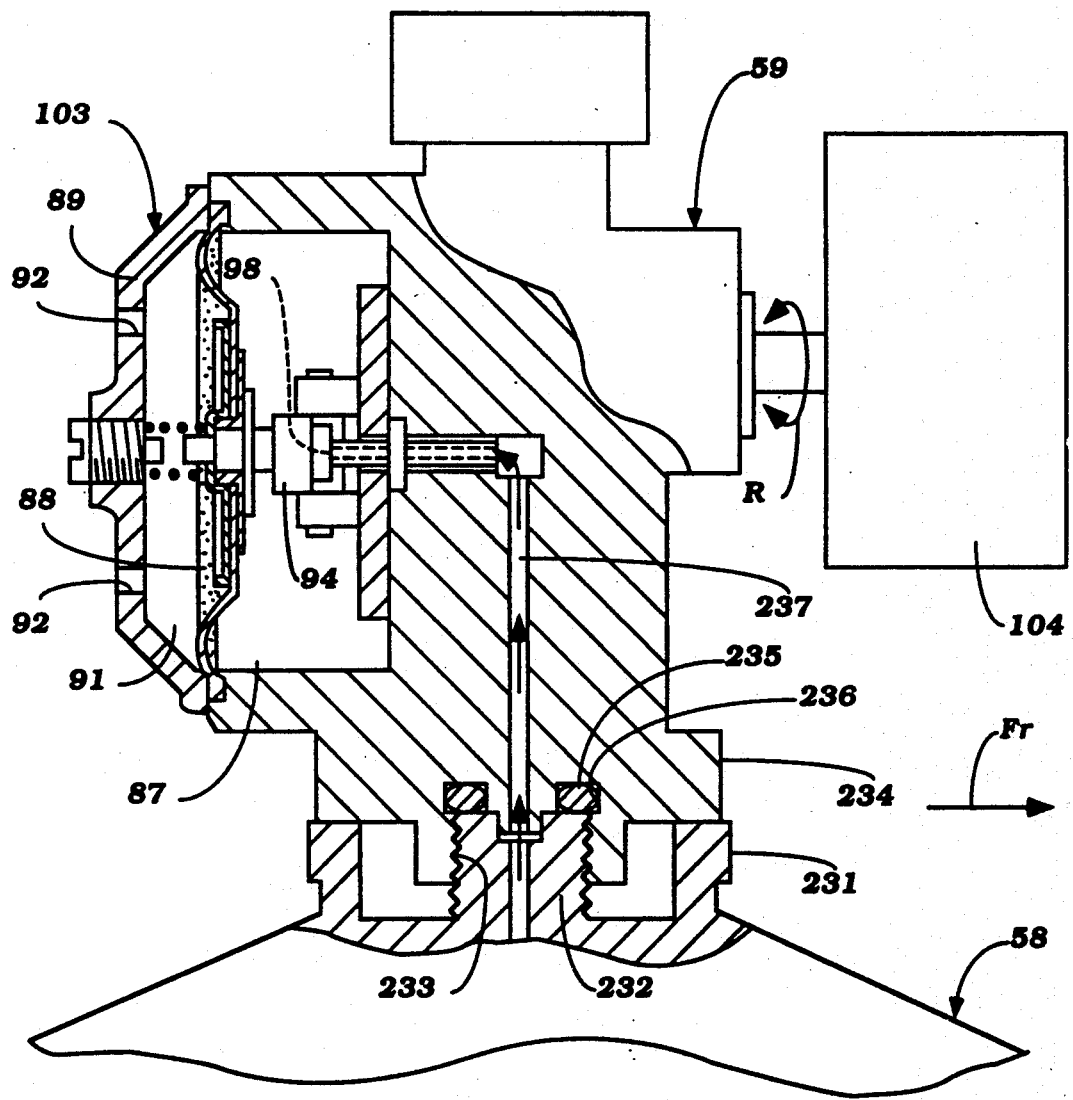
FIG. 17 is a cross sectional view of this embodiment taken through the pressure regulator and attachment to the fuel container.
Figure 18:
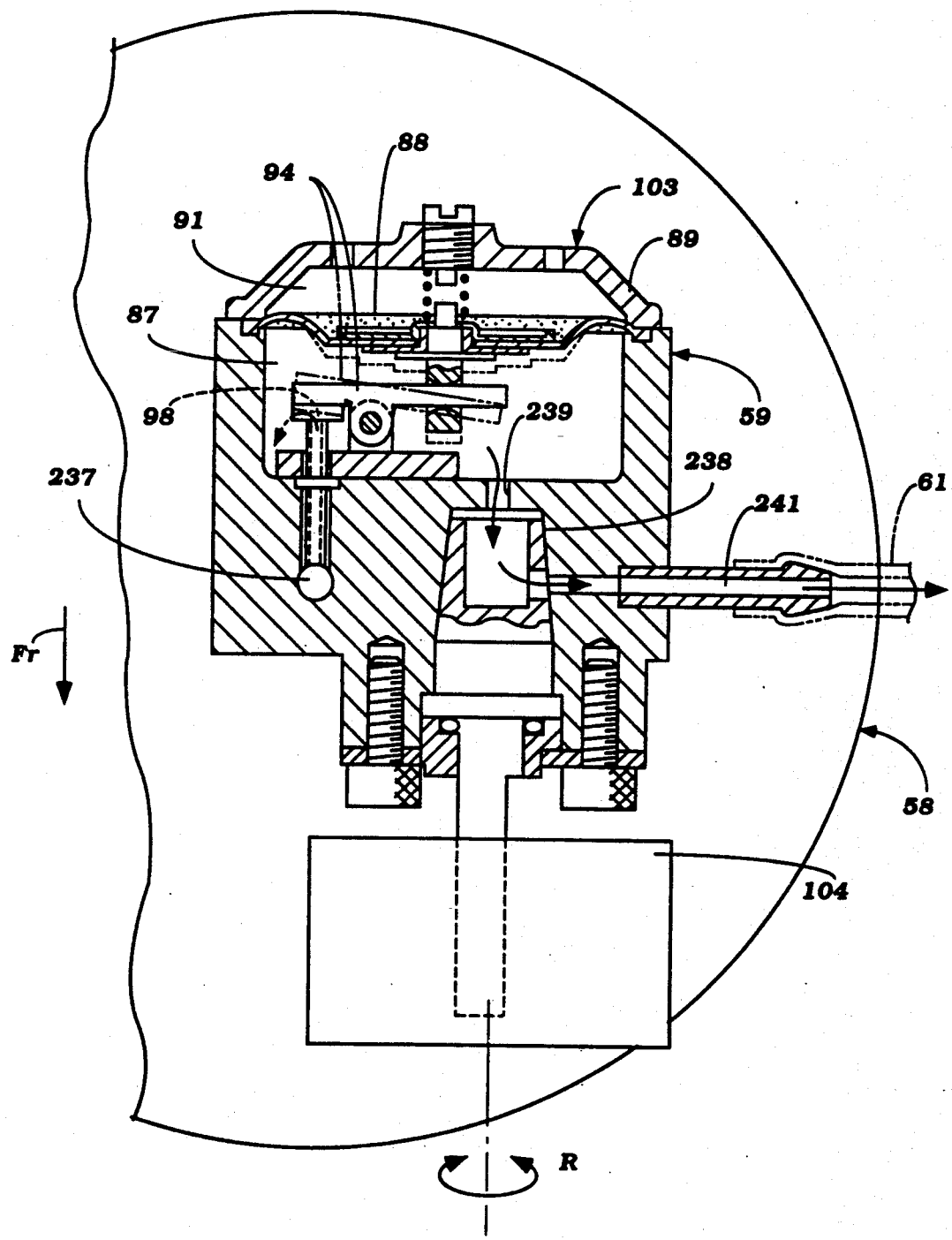
FIG. 18 is a cross sectional view of this embodiment and is taken generally along a plane perpendicular to the plane of FIG. 17 but with the components rotated 90° in a clockwise direction.

In the embodiments of the invention as thus far described, the pressure regulator 103 has been shown only schematically. In this embodiment and as best shown in FIGS. 17 and 18, the regulator 103 is mounted within the mounting portion 59. Aside from this difference, this embodiment is the same as the previously described embodiments. The components of the regulator 103 which are the same as those of the regulator 84 have been identified by the same reference numerals and it is believed that those skilled in the art will understand how the regulator 103 works.

In FIGS. 17 and 18, the manner in which the container 58 of fuel is connected to the mounting portion 59 is shown in more detail. It should be noted that the container 58 has an upwardly positioned flange 231 which surrounds a male threaded portion 232. This male threaded portion 232 is adapted to be threadingly received into a female threaded opening 233 formed interiorly of a lower flange 234 of the mounting portion 59. An annular gasket 235 is received within a circumferential recess 236 formed in the mounting portion at the base of the threads 233 to effect sealing.

The pressurized fuel flows from the container 258 to the inlet port 98 of the regulator 103 through an internal passageway 237 formed in the mounting portion 59.

The shut off valve 104 has a valve spool portion 238 that cooperates with an outlet port 239 from the regulator chamber 87 to a fitting 241 to which the flexible conduit 61 is attached for controlling the on/off condition of the fuel supply to the engine.

It should be readily apparent that the foregoing described embodiments of the invention provide compact, lightweight low noise outboard motors powered by a gaseous fuel and in which the internal combustion engine is positioned at least in part beneath the water level for silencing and to provide a simpler construction but wherein excess cooling of the engine is avoided and more uniform operating temperatures may be maintained. Also, a number of pressure regulator constructions have been disclosed that permit tilt and trim operation of the operation of the outboard motor without changing the air/fuel ratio. Furthermore, the mounting arrangement for the outboard motor is such that the motor can be easily and conveniently swung from an out-of-the-water position to a storage position within the hull of the watercraft. Of course, the described embodiments are merely preferred embodiments of the invention and various changes and modifications may be made without departing from the spirit and scope of the invention, as defined by the appended claims.

We claim:

1. An outboard motor having an upper portion adapted to be affixed to the hull of an associated watercraft, a lower unit comprised of an outer housing adapted to be at least partially submerged in a body of water in which the watercraft is operated, a propulsion device carried by said lower unit for powering said watercraft, an internal combustion engine contained entirely within said lower unit outer housing for driving said propulsion device, said engine having a housing defining at least in part a combustion chamber, said lower unit housing defining a cavity surrounding said engine housing, said internal combustion engine having an exhaust port for discharging exhaust gases from said engine into said surrounding lower unit outer housing cavity for circulating the exhaust gases from said exhaust port around at least a portion of said engine for preventing excess cooling of said engine, and an exhaust system for discharging the exhaust gases from said surrounding cavity externally of said outboard motor.

2. An outboard motor as set forth in claim 1 wherein the engine is cooled solely by virtue of the lower unit being submerged within the body of water in which the watercraft is operating and the engine has no cooling jacket.

3. An outboard motor as set forth in claim 2 wherein the engine is cooled solely by virtue of the lower unit being submerged within the body of water in which the watercraft is operating and the engine has no cooling fins.

4. An outboard motor as set forth in claim 3 wherein the engine housing comprises a cylinder block and the exhaust gases are circulating at least in part around the cylinder block.

5. An outboard motor as set forth in claim 1 further including an inner casing contained within the lower unit outer housing and receiving at least in part the internal combustion engine, the exhaust gases being discharged into the internal casing.

6. An outboard motor as set forth in claim 5 further including means for admitting water to the lower unit around the internal casing.

7. An outboard motor as set forth in claim 6 wherein the engine is cooled solely by virtue of the lower unit being submerged within the body of water in which the watercraft is operating and the engine has no cooling jacket.

8. An outboard motor as set forth in claim 7 wherein the engine is cooled solely by virtue of the lower unit being submerged within the body of water in which the watercraft is operating and the engine has no cooling fins.

9. An outboard motor as set forth in claim 8 wherein the engine housing comprises a cylinder block and the exhaust gases are circulated at least in part around the cylinder block.

10. An outboard motor as set forth in claim 1 wherein the exhaust system further includes means for delivering the exhaust gases to an area within the outboard motor above the level of water in which the watercraft is operating and then discharging the exhaust gases from the lower unit at an area below the water level.

11. An outboard motor as set forth in claim 10 further including an inner casing contained within the lower unit outer housing and receiving at least in part the internal combustion engine, the exhaust gases being discharged into the internal casing.

12. An outboard motor as set forth in claim 11 further including means for admitting water to the lower unit around the internal casing.

13. An outboard motor as set forth in claim 12 wherein the exhaust gases are discharged from the internal casing through a conduit extending vertically upwardly from the lower unit and then returning the exhaust gases into the lower unit.

14. An outboard motor as set forth in claim 13 wherein there is provided an expansion chamber in the area of the outboard motor above the water level to which the gases are delivered.

15. An outboard motor as set forth in claim 14 wherein the exhaust gases are discharged through the rear end of the lower unit in proximity to the propulsion device.

16. An outboard motor as set forth in claim 1 wherein the engine is supplied with a gaseous fuel from an container containing the gaseous fuel under pressure sufficient to liquify at least a portion of the gaseous fuel.

17. An outboard motor as set forth in claim 16 wherein the gaseous fuel source is positioned above the lower unit.

18. An outboard motor as set forth in claim 17 wherein the outboard motor is supported for tilting movement for varying the degree of submersion of the propulsion device in the body of water in which the watercraft is operating.

19. An outboard motor as set forth in claim 18 wherein the container of pressurized gaseous fuel is carried by the hull of the associated watercraft remotely from the propulsion device.

20. An outboard motor as set forth in claim 19 wherein the outboard motor includes a mounting bracket adapted to span the hull of the watercraft and be affixed to the opposite sides thereof and wherein the upper portion and lower unit are supported by the mounting portion for steering movement about a vertically extending steering axis.

21. An outboard motor as set forth in claim 20 wherein the source of pressurized gaseous fuel is supported on the mounting portion.

22. An outboard motor as set forth in claim 20 wherein the mounting bracket has a generally L-shape with the long legs spanning the sides of the hull and a short leg extending along one side of the hull.

23. An outboard motor as set forth in claim 16 further including pressure regulator means for regulating the pressure of the fuel supplied from the container to the engine.

24. An outboard motor as set forth in claim 23 wherein the pressure regulator includes a diaphragm.

25. An outboard motor as set forth in claim 24 wherein the outboard motor is supported for movement in a plane for varying the degree of submersion of the propulsion device and wherein the diaphragm lies in a plane parallel to or coincident with the plane.

26. An outboard motor as set forth in claim 25 wherein the movement of the outboard motor is about a horizontally extending axis that extends transversely to the watercraft hull.

27. An outboard motor as set forth in claim 25 wherein the movement of the outboard motor is about a horizontally extending axis that extends longitudinally to the watercraft hull.

28. An outboard motor as set forth in claim 25 wherein the regulator is positioned in the lower unit.

29. An outboard motor as set forth in claim 25 wherein the regulator is positioned in the upper portion of the outboard motor.

30. An outboard motor as set forth in claim 23 wherein a further regulator is carried by the mounting portion of the outboard motor.

31. An outboard motor as set forth in claim 30 wherein the outboard motor includes a mounting bracket adapted to span the hull of the watercraft and be affixed to the opposite sides thereof and wherein the upper portion and lower unit are supported by the mounting portion for steering movement about a vertically extending steering axis.

32. An outboard motor as set forth in claim 31 wherein the mounting bracket has a generally L-shape with the long legs spanning the sides of the hull and a short leg extending along one side of the hull.

* * * * *